(12) United States Patent
Amoretti

(10) Patent No.: US 6,705,162 B2
(45) Date of Patent: Mar. 16, 2004

(54) PROBE ASSEMBLY FOR MONITORING THE WATER LEVEL IN ELECTRIC RESISTOR BOILERS

(75) Inventor: Luigi Amoretti, Mussolente (IT)

(73) Assignee: T.P.A. Impex S.p.A., Romano d'Ezzelino (IT)

( * ) Notice: Subject to any disclaimer, the term of this patent is extended or adjusted under 35 U.S.C. 154(b) by 0 days.

(21) Appl. No.: 10/014,871

(22) Filed: Dec. 14, 2001

(65) Prior Publication Data

US 2002/0053240 A1 May 9, 2002

(30) Foreign Application Priority Data

Dec. 21, 2000 (IT) ..................... PD2000A0287

(51) Int. Cl.[7] .......................... G01F 23/00; G08B 21/00
(52) U.S. Cl. ................. 73/304 C; 73/290 R; 73/295; 73/304 R; 340/620
(58) Field of Search ............... 73/290 R, 295, 73/304 R, 304 C; 340/620

(56) References Cited

U.S. PATENT DOCUMENTS

| | | | | |
|---|---|---|---|---|
| 2,679,642 A | | 5/1954 | Wexler | |
| 3,831,069 A | * | 8/1974 | Merrell et al. | 361/272 |
| 3,919,680 A | * | 11/1975 | Ueno et al. | 338/22 R |
| 4,123,131 A | * | 10/1978 | Pearce et al. | 204/428 |
| 4,299,117 A | * | 11/1981 | Andrews et al. | 374/145 |
| 4,497,205 A | * | 2/1985 | Zulauf et al. | 200/84 C |
| 4,842,419 A | * | 6/1989 | Nietert | 337/107 |
| 5,661,251 A | * | 8/1997 | Cummings et al. | 73/304 R |
| 6,207,045 B1 | * | 3/2001 | Jiang | 210/114 |

* cited by examiner

*Primary Examiner*—Hezron Williams
*Assistant Examiner*—Katina Wilson
(74) *Attorney, Agent, or Firm*—Guido Modiano; Albert Josif; Daniel O'Byrne

(57) ABSTRACT

A probe assembly for monitoring the water level in boilers with an electric immersion resistor heater, of the type that comprises at least one sensor element to be arranged inside a hollow body which is in turn associated and partially inserted in the boiler. The hollow body has, on the portion arranged outside the boiler, a plug which axially supports the sensor element; the end of the sensor element arranged at the plug is connected, when the plug is installed, by way of at least one electrical contact, to an electrical power supply cable, whose contact end is arranged at the portion of hollow body that is arranged outside the boiler.

20 Claims, 3 Drawing Sheets

PROBE ASSEMBLY FOR MONITORING THE WATER LEVEL IN ELECTRIC RESISTOR BOILERS

BACKGROUND OF THE INVENTION

The present invention relates to a probe assembly for monitoring the water level in boilers fitted with an electric immersion resistor heater.

This type of probe assembly can be applied to boilers of electrical household appliances, industrial machines, boilers for domestic heating, et cetera.

In these applications it is possible to restore the level of the water inside the boiler on the basis of the indication of one or more probes that enter said boiler and monitor said level.

However, prior probes are not free from drawbacks.

The main one is the fact that the probes are exposed to the turbulence that is normally present inside the boiler chamber, consequently altering the sensitivity of the probe or probes.

The variation of the sensitivity of the probe or probes causes it or them to emit signals indicating that the lower limit of the water level has been reached at incorrect times and in incorrect manners.

In particular, the greatest damage occurs when the probe is late in detecting that the lower limit of the water level has been reached and therefore it is necessary to add substantial amounts of cold water in order to restore the optimum level; the injection of cold water lowers the internal temperature of the boiler, consequently lowering the pressure.

This pressure drop accordingly causes a delay in the supply of steam, which in the case of electric household appliances leads to an idle time during cleaning operations.

Furthermore, it has been noted, especially after long and prolonged use, that the probes currently in use tend to fill with scale, causing new problems in addition to the ones already described in relation to turbulence.

In order to solve the above cited drawbacks, solutions have been proposed in which the probe or probes are inserted in hollow bodies for protection against turbulences.

Although these solutions are effective, they have nonetheless not solved other drawbacks related to the positioning of the electrical connections of the probes as well as to the possibility of accidental opening of the closure plug.

The electrical connection cable is in fact currently rigidly coupled to the top of the plug and this entails that in order to comply with currently applicable safety standards it is necessary to cover said cable with a door (for example, one cannot leave an external cable, since it could be pulled and might break), with consequent constructive complications and limitations.

SUMMARY OF THE INVENTION

The aim of the present invention is to provide a probe assembly for monitoring the water level in boilers provided with an electric immersion resistor heater which solves the above mentioned drawbacks of prior models, particularly providing an optimum positioning of the electrical connections of the probe or probes and at the same time ensuring a detection that is always effective and accurate even in the presence of high turbulence inside the boiler and of scale deposits on said probes.

Within this aim, an important object of the present invention is to provide a probe assembly that complies with safety standards and therefore has a high level of safety for the user and for the operator, preventing accidental and/or inadvertent openings of the closure plug, as well as pulling of the electrical connection wire.

Another object of the present invention is to provide a probe assembly whose application does not detract in any way from the performance of the boiler.

Another object of the present invention is to provide a probe assembly with high flexibility of application in relation to the type of boiler and its intended use.

Another object of the present invention is to provide a probe assembly that can be manufactured with known technologies and systems and at prices that are competitive with respect to competing commercially available probe assemblies.

This aim and these and other objects that will become better apparent hereinafter are achieved by a probe assembly for monitoring the water level in boilers with an electric immersion resistor heater, of the type that comprises at least one sensor element to be arranged inside a hollow body which is in turn associated and partially inserted in the boiler, said assembly being characterized in that said hollow body has, on the portion arranged outside the boiler, a plug which axially supports said sensor element, the end of said sensor element arranged at said plug being connected, when said plug is installed, by means of at least one electrical contact, to an electrical power supply cable, whose contact end is arranged at said portion of hollow body that is arranged outside the boiler.

BRIEF DESCRIPTION OF THE DRAWINGS

Further characteristics and advantages of the present invention will become better apparent from the description of an embodiment thereof, illustrated only by way of non-limitative example in the accompanying drawings, wherein.

DESCRIPTION OF THE PREFERRED EMBODIMENTS

Figure 1:
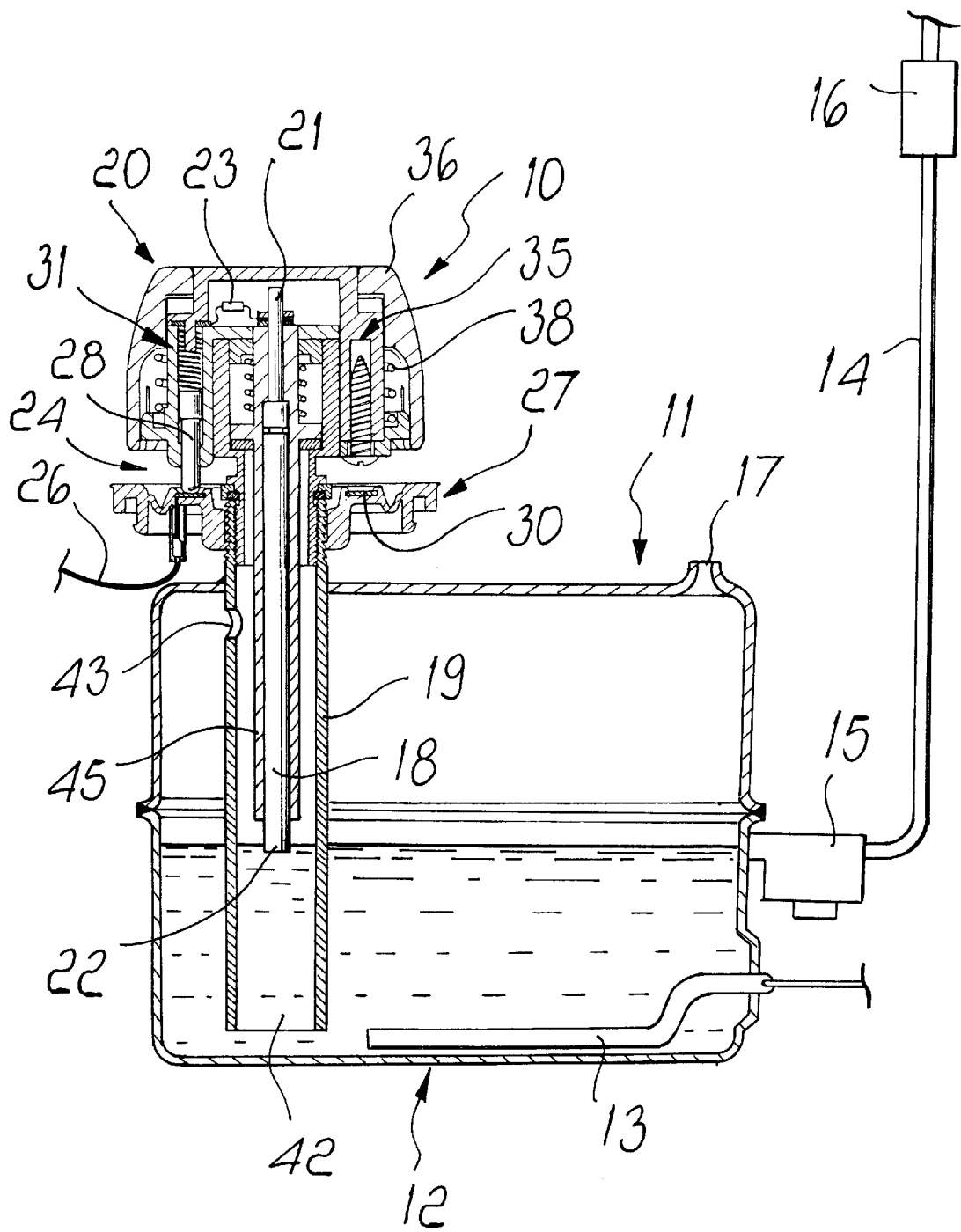
FIG. 1 is a partially sectional orthographic projection view of a probe assembly according to the invention, applied to a boiler.
Figure 2:
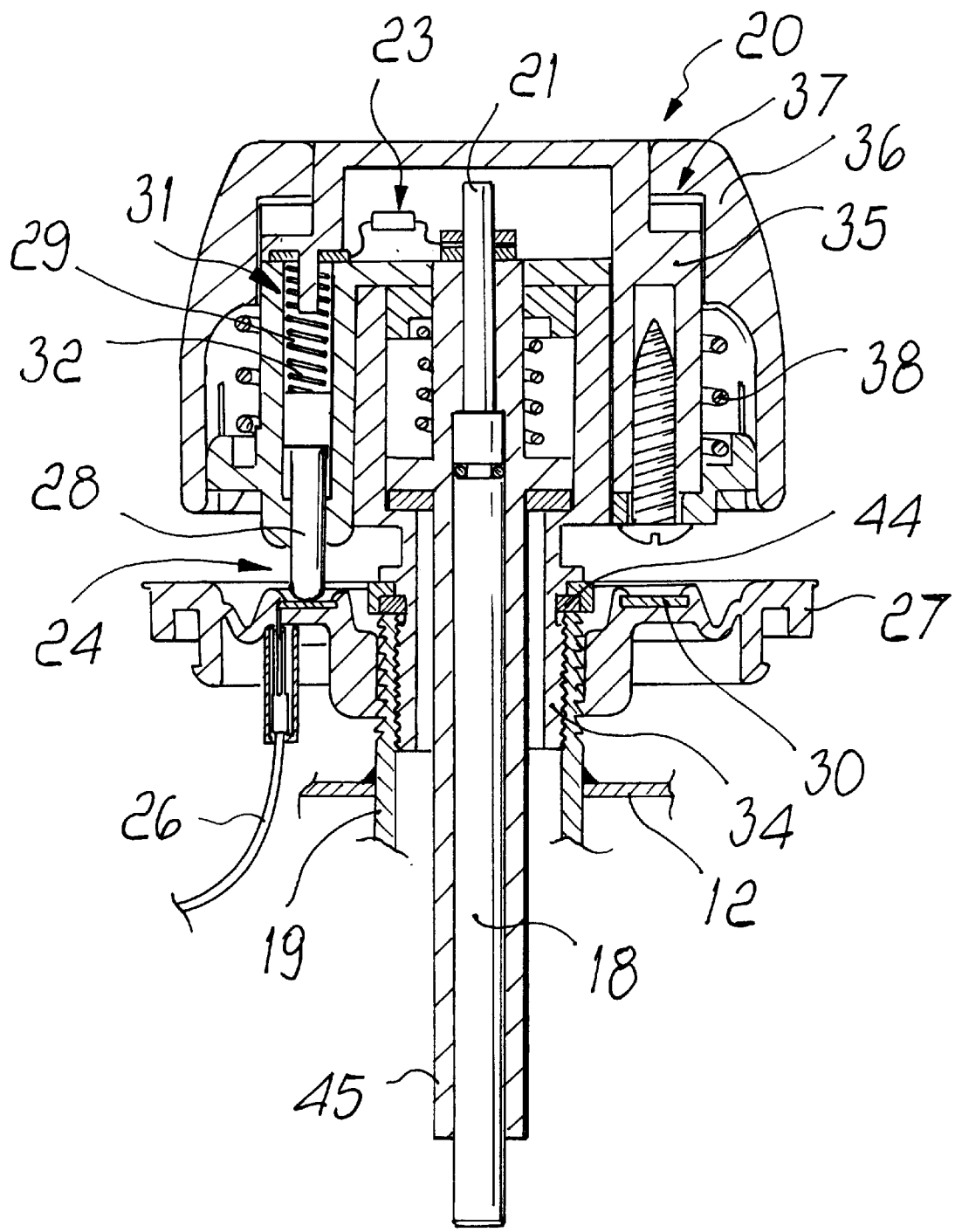
FIG. 2 is a partially sectional orthographic projection view of the probe assembly of FIG. 1.
Figure 3:
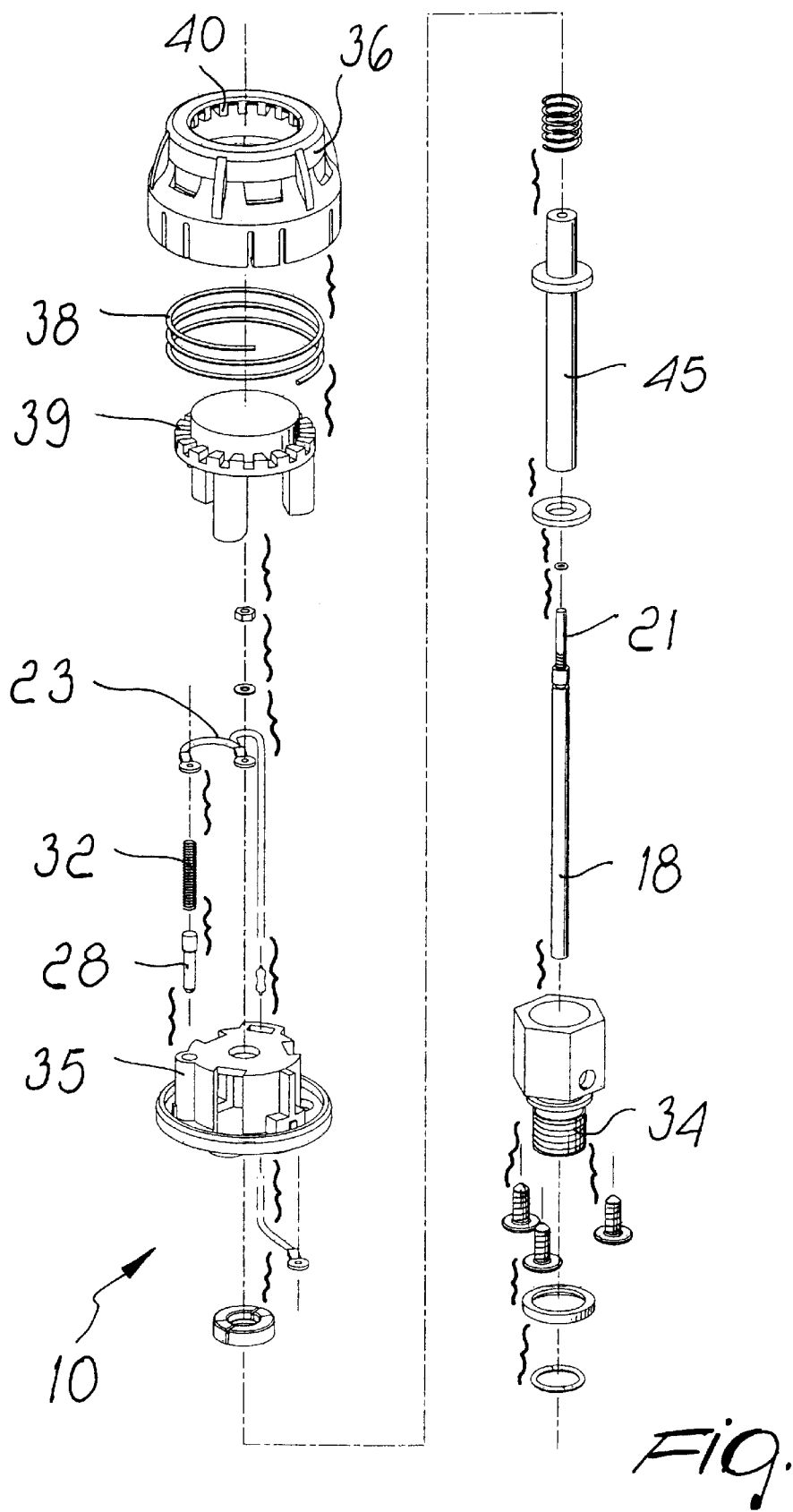
FIG. 3 is an exploded view of the probe assembly of FIG. 1.

With reference to FIGS. 1 to 3, a probe assembly for monitoring the water level in boilers provided with an electric immersion resistor heater, according to the invention, is generally designated by the reference numeral 10.

The probe assembly 10, in this case, is associated for example with a boiler for steam-using electric household appliances of the continuous top-up type, generally designated by the reference numeral 11 and substantially constituted by a closed container 12, inside which there is an immersion resistor heater 13 and to which a supply duct 14 is coupled after interposing an electric valve, or a water recirculation valve of the so-called one-way type, designated by the reference numeral 15 and associated with a top-up pump 16.

The supply duct 14 is conveniently connected to a tank or to a cock, not shown in the figures.

The container 12 furthermore has a steam discharge hole 17, which is conveniently connected to distribution ducts, which also are not shown.

In this embodiment, the probe assembly 10 comprises a sensor element 18, which is substantially rod-like and inserted in a hollow body 19, which in turn is associated, in this case stably by welding, and partially inserted in the boiler 11.

The hollow body 19, outside said boiler 11, is coupled to a hollow plug 20 in which the end 21 of the sensor element 18 is inserted, said sensor element being meant to be arranged inside the boiler 11.

According to the invention, the end 21 is connected, by means of an electrical sliding contact 24 located at the base of said plug 20, to an electric power supply cable 26.

More particularly, the end 21 inside said plug 20 is connected to a connector 23, which is in turn connected to the electrical sliding contact 24.

The contact 24 is connected to the electric power supply cable 26 and is supported by a base collar 27, which is associated with said hollow body 19, below said plug 20.

The electrical contact 24 is constituted by a pin 28, which is made of electrically conducting material, is partially and slidingly inserted in a seat 29 formed in said plug 20, and is kept pushed outward by elastic means 31 in adjustable sliding contact with a ring 30, which is also made of electrically conducting material and is fixed so as to support said base collar 27.

The pin 28 makes contact with the connector 23, while the ring 30 is instead in contact with the power supply cable 26.

The pusher means 31 consists in particular of a metallic helical spring 32, which is also suitable to form the electrical connection between the pin 28 and said first conducting means 23.

The base collar 27 is detachably connected, through a screw-and-nut coupling, externally to said hollow body 19, while the plug 20 is provided, in a downward region, with an externally threaded tang 34 which engages, through a screw-and-nut coupling, inside said hollow body 19.

As an alternative, the base collar 27 can have, on the surface for coupling to the hollow body 19, an annular sawtooth shape, which engages a complementary shape of said hollow body 19 so that the base collar 27, once inserted, can no longer be disengaged; advantageously, at least one of the sawtooth shapes shall be made of elastically deformable material in order to allow insertion.

The plug 20, in this embodiment, is composite, since it is constituted by a first inner base portion 35, which is connected to said hollow body 19 and is associated with a second outer portion 36 that is available to the action of the operator; said two portions are mutually associated according to two separate states, which can be defined by the action of said operator.

In a first idle state, the second portion 36 can slide freely on said first portion 35; in a second state, the second portion is instead connected by way of actuation means, generally designated by the reference numeral 37, so as to rigidly turn the first portion 35.

Furthermore, the first and second portions, designated by the reference numerals 35 and 36 respectively, can slide with respect to each other, even axially, within a limited and predefined stroke, since they are coupled axially by interposing an elastic contrast pusher element constituted by a helical spring 38.

The actuation means 37 is constituted by two complementary series of teeth, designated by the reference numerals 39 and 40 respectively, which are formed in respective mutually opposite portions of said first and second portions 35 and 36, and are suitable to mesh in said second state.

In particular, it is noted that the actuation means 37 ensures a high level of safety for the user and for the operator, preventing in practice accidental and/or inadvertent openings of the closure plug 20; in order to open said plug it is in fact necessary to perform an intentional compression of the second portion 36 on the first portion 35, which is substantially impossible to do inadvertently.

The hollow body 19 is associated by insertion in said boiler 11 in a substantially vertical direction, and its inner or lower end lies below the minimum level of the water; more precisely, the hollow body 19 is suitable to form a separate chamber that is external to the boiler 11 and is connected thereto by means of at least two openings; one of said openings, designated by the reference numeral 42, is arranged in a region where water is normally present, while the other opening, designated by the reference numeral 43, is arranged in a region where steam is normally present, so as to provide the correct flow of fluids according to the principle of communicating vessels by means of a compensation of overpressures.

The probe assembly 10 also comprises sealing means, constituted by an annular elastomeric gasket 44 inserted at said plug; furthermore, the sensor element 18 is partially covered by a sheath 45 for protection against steam, which is made of plastics.

In more complete embodiments it is possible to provide, in association with the probe assembly 10, safety means of a per se known type for pressure and/or temperature control, which can be constituted for example by pressure relief valves or equivalent devices.

In practice it has been found that the present invention has achieved the intended aim and objects.

In particular it should be noted that the probe assembly according to the invention, in addition to ensuring a constantly effective and precise detection even in the presence of high turbulence inside the boiler, at the same time ensures optimum positioning of the electrical connections of the probe, which are partially incorporated in the closure plug and exit in a region that does not interfere with the operating space of the user or operator.

Moreover, it should be noted that the probe assembly according to the invention ensures a high level of safety for the user and for the operator by preventing in practice accidental and/or inadvertent openings of the closure plug; in order to open said plug it is in fact necessary to apply an intentional compression, which is substantially impossible to perform inadvertently.

With the above described probe assembly, the user can perform maintenance and cleaning of the probe without resorting to a support service, which requires time and is expensive.

International standards in fact forbid users to open the boiler and only allow repair technicians to do so.

With the new probe assembly, its maintenance becomes perfectly legitimate.

Moreover, it should be noted that the application of the probe assembly according to the invention does not detract in any way from the performance of the boiler.

The probe assembly according to the invention is furthermore highly flexible in application in relation to the type of boiler and to its intended use.

Furthermore, the probe assembly can be provided with a safety valve produced and arranged in various manners.

The present invention is susceptible of numerous modifications and variations, all of which are within the scope of the appended claims.

The technical details may be replaced with other technically equivalent elements.

The materials and the dimensions may be any according to requirements.

The disclosures in Italian Patent Application No. PD2000A000287 from which this application claims priority are incorporated herein by reference.

What is claimed is:

1. A probe assembly for monitoring the water level in a boiler with an electric immersion resistor heater for steam generation, comprising: a hollow body associated with and partially inserted in the boiler; at least one submersible, electricity powered sensor element for water level monitoring to be arranged inside the hollow body; a plug provided on an external portion of said hollow body which is arranged outside the boiler; an electrical power supply cable, a contact end whereof is arranged at said portion of hollow body that is arranged outside the boiler; at least one electrical contact; said plug axially supporting said at least one sensor element with an end of said at least one sensor element arranged at said plug being connected, upon installation of said plug, by way of said at least one electrical contact, to said electrical power supply cable, said electric contact being a sliding electric contact, said plus being rotatable, said sliding electric contact comprising a fixed portion to which said electrical power supply cable is connected, and said sliding electric contact comprising a sliding portion in electrical sliding contact with said fixed portion iron rotation of said plug.

2. The probe assembly of claim 1, further comprising a connector, the end of said at least one sensor element arranged at the plug being connected, by way of said connector, to said sliding electric contact connected to said electric power supply cable.

3. The probe assembly of claim 2, further comprising: elastic pusher means; a base collar; a ring which is made of electrically conducting material and is fixed so as to support said base collar; said electric contact being provided by at least one pin, made of electrically conducting material, which is partially and slidingly inserted in an axial seat formed in said plug and is kept pushed outward by said elastic pusher means in adjustable sliding contact with said ring, said at least one pin being connected to said at least one sensor element, and said ring being connected to said power supply cable.

4. The probe assembly of claim 3, wherein said elastic pusher means is constituted by a helical spring adapted to provide electrical connection between said at least one pin and said probe.

5. The probe assembly of claim 3, wherein said base collar is detachably connected by way of a screw-and-nut coupling to the portion of said hollow body that lies outside the boiler.

6. The probe assembly of claim 5, wherein said base collar has, on a surface for coupling to said hollow body, an annular sawtooth shape which engages a complementary sawtooth shape of said hollow body, said sawtooth shapes allowing only insertion of said base collar, with at least one of said sawtooth shapes being made of elastically deformable material.

7. The probe assembly of claim 3, wherein said plug has, in a downward region, an externally threaded tang which engages, through a screw-and-nut coupling, inside the external portion of said hollow body.

8. The probe assembly of claim 7, further comprising actuation means, said plug having a composite construction, being constituted by a first inner base portion, which engages on said hollow body, associated with a second outer portion available for operator action, said first and second portions being mutually associated in two separate states, a first state in which said second portion is able to slide so as to rotate freely on said first portion, and a second state in which said second portion turns said first portion, said first and second portions being connected through said actuation means.

9. The probe assembly of claim 8, wherein said first and second portions are provided so as to be slidable with respect to each other axially within a limited and preset stroke.

10. The probe assembly of claim 8, comprising an elastic contrast pusher element, said first and second portions being axially coupled by the interposition of said elastic contrast pusher element.

11. The probe assembly of claim 10, wherein said elastic contrast pusher element is constituted by a helical spring.

12. The probe assembly of claim 8, wherein said actuation means are constituted by two series of complementary teeth formed in respective opposite portions of said first and second portions and adapted to mesh in said second state.

13. The probe assembly of claim 3, wherein said hollow body is associated by insertion in said boiler along a substantially vertical direction.

14. The probe assembly of claim 3, wherein a lower end of said hollow body lies below the minimum level of the water.

15. The probe assembly of claim 3, comprising sealing means constituted by at least one annular elastomeric gasket inserted at said plug.

16. The probe assembly of claim 15, further comprising a steam protection sheath made of plastics for covering at least partially said sensor element.

17. The probe assembly of claim 3, wherein said hollow body forms an independent chamber comprising at least two openings, said chamber being external to said boiler and connected thereto by way of said at least two openings, a first one of which is arranged in a region where water is normally present, and a second one being arranged in a region where steam is normally present, so as to provide a correct passage of fluids according to the principle of communicating vessels by overpressure compensation.

18. The probe assembly of claim 3, further comprising safety means for pressure and temperature control.

19. A boiler with an electric immersion resistor heater for steam generation with a probe assembly for monitoring the water level, the probe assembly comprising: a hollow body associated with and partially inserted in the boiler; at least one submersible, electricity powered sensor element for water level monitoring to be arranged inside the hollow body; a plug provided on an external portion of said hollow body which is arranged outside the boiler; an electrical power supply cable, a contact end whereof is arranged at said portion of hollow body that is arranged outside the boiler; at least one electrical contact; said plug axially supporting said at least one sensor element, with an end of said at least one sensor element arranged at said plug being connected, upon installation of said plug, by way of said at least one electrical contact, to said electrical power supply cable, said electric contact being a sliding electric contact, said plug being rotatable, said sliding electric contact comprising a fixed portion to which said electrical power supply cable is connected, and said sliding electric contact comprising a sliding portion in electrical sliding contact with said fixed portion upon rotation of said plug.

20. A probe assembly for monitoring the water level in a boiler, comprising: a hollow body associated with and partially inserted in the boiler; at least one submersible, electricity powered sensor element for water level monitoring to be arranged inside the hollow body; a plug provided on an external portion of said hollow body which is arranged outside the boiler; an electrical power supply cable, a contact end whereof is arranged at said portion of hollow body that is arranged outside the boiler; at least one electrical contact said plug axially supporting said at least one sensor element, with an end of said at least one sensor element arranged at said plug being connected, upon installation of said plug, by way of said at least one electrical contact, to said electrical power supply cable, said electric contact being a sliding electric contact, said plug being rotatable, said sliding electric contact comprising a fixed portion to which said electrical power supply cable is connected, and said sliding electric contact comprising a sliding portion electrical sliding contact with said fixed portion upon rotation of said plug.

* * * * *